(12) United States Patent
Takahashi

(10) Patent No.: US 7,582,388 B2
(45) Date of Patent: Sep. 1, 2009

(54) NON-AQUEOUS SOLVENT SECONDARY BATTERY

(75) Inventor: Kentaro Takahashi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 835 days.

(21) Appl. No.: 10/936,658

(22) Filed: Sep. 9, 2004

(65) Prior Publication Data

US 2005/0053843 A1 Mar. 10, 2005

(30) Foreign Application Priority Data

Sep. 9, 2003 (JP) ............................. 2003-316641

(51) Int. Cl.
*H01M 6/16* (2006.01)
*H01M 6/14* (2006.01)

(52) U.S. Cl. ...................... 429/329; 429/301; 429/303; 429/324; 429/326; 429/327

(58) Field of Classification Search ........................ None
See application file for complete search history.

(56) References Cited

U.S. PATENT DOCUMENTS

| 4,670,363 | A | * | 6/1987 | Whitney et al. | ............. | 429/327 |
|---|---|---|---|---|---|---|
| 7,223,502 | B2 | * | 5/2007 | Onuki | ......................... | 429/326 |
| 2002/0076605 | A1 | * | 6/2002 | Akashi et al. | ................. | 429/60 |
| 2003/0003370 | A1 | * | 1/2003 | Arai et al. | ................... | 429/326 |
| 2003/0054259 | A1 | | 3/2003 | Murai et al. | | |
| 2003/0165733 | A1 | * | 9/2003 | Takehara et al. | ............ | 429/101 |
| 2004/0043295 | A1 | * | 3/2004 | Rodriguez et al. | .......... | 429/303 |

FOREIGN PATENT DOCUMENTS

| JP | 08-045545 | 2/1996 |
|---|---|---|
| JP | 2000-268859 | 9/2000 |
| JP | 2001-006729 | 1/2001 |
| JP | 2001-202991 | 7/2001 |
| JP | 2002-305031 | 10/2002 |
| JP | 2002-352852 | 12/2002 |
| JP | 2003-031263 | 1/2003 |
| JP | 2003-151623 | 5/2003 |
| JP | 2003-257479 | 9/2003 |

* cited by examiner

*Primary Examiner*—Dah-Wei D Yuan
*Assistant Examiner*—Maria J Laios
(74) *Attorney, Agent, or Firm*—Nixon & Vanderhye P.C.

(57) ABSTRACT

A non-aqueous solvent secondary battery with a high initial charge/discharge capacity and excellent charge/discharge characteristics at high temperature, having a positive electrode containing a positive electrode active material capable of reversibly occluding and releasing lithium, a negative electrode containing a negative electrode active material capable of reversibly occluding and releasing lithium and a non-aqueous solvent electrolyte containing (1) acrylic acid anhydride, and (2) an aromatic compound having at least one electron donating group, wherein the electron donating group comprises at least one member selected from any of the alkyl group, alkoxy group, alkylamino group and amine, provided that each of the alkyl group, alkoxy group and alkylamino group includes a halogen substituted group and a cycloaliphatic group.

13 Claims, 1 Drawing Sheet

NON-AQUEOUS SOLVENT SECONDARY BATTERY

BACKGROUND OF THE INVENTION

1. Field of the Invention

The present invention concerns a non-aqueous solvent secondary battery and, more specifically, a non-aqueous solvent secondary battery having a large initial charge/discharge capacity and excellent charge/discharge characteristics at high temperature.

2. Description of the Related Art

Along with the rapid popularization of portable types of electronic equipment, specifications required for batteries used therein have become more and more stringent such that small and lightweight batteries having high capacity, excellent cyclic characteristics, and performance stability have become in demand. In the field of secondary batteries, the quality of higher energy density that lithium non-aqueous solvent secondary batteries have compared to those of other batteries has become prominent such that the market share of lithium non-aqueous solvent secondary batteries has remarkably increased.

A lithium non-aqueous solvent secondary battery basically consists of a negative electrode formed by coating a film of negative electrode active material mix on both surfaces of a negative electrode current collector comprising an elongate sheet-like copper foil or the like, a positive electrode formed by coating a film of positive electrode active material mix on both surfaces of a positive electrode current collector comprising an elongate sheet-like aluminum foil, and a separator comprising a highly porous polypropylene film or the like disposed between them, in which the negative electrode and the positive electrode are wound into a cylindrical or elliptical shape as to remain insulated from each other by the separator and then the wound electrode body is further pressed into a flattened shape in the case of a square cell, and a negative electrode lead and a positive electrode lead are connected to the negative electrode and the positive electrode at predetermined portions thereof respectively, thereafter being housed in an exterior body of a predetermined shape.

For the non-aqueous solvent used in the non-aqueous solvent secondary battery, since the dielectric constant must be high in order to ionize the electrolyte and ion conductivity must likewise be high under conditions of temperatures varying within a wide range, organic solvent, such as carbonates like propylene carbonate (PC), ethylene carbonate (EC), butylene carbonate (BC), and diethyl carbonate (DEC), lactones like butyrolactone, as well as ethers, ketones and esters are used and, particularly, mixed solvents of EC and a non-cyclic carbonate ester of low viscosity like dimethyl carbonate (DMC), diethyl carbonate (DEC), and methyl ethyl carbonate (MEC) have been generally used. However, the use of such materials causes the battery to become swollen when stored at high temperature because of low vapor pressure.

On the other hand, since non-aqueous solvents containing PC or BC have high vapor pressure and high oxidation potential, they are less likely to decompose, thereby effectively evolve less amounts of gas and reduce swelling of the cell, and have excellent low temperature characteristics owing to their low coagulation point.

Further, since negative electrodes use carbonaceous materials such as graphite and amorphous carbon as material for the negative electrode, they cost less but have excellent cycle life, and are therefore generally used. However, the use of non-aqueous solvent electrolyte containing PC or BC diminishes the capacity of the battery during charging due to the rapid decomposition of PC or BC. Particularly, the use of carbonaceous material of increased graphitization degree (natural graphite, artificial graphite) of high capacity gives rise to the problem where PC or BC is more rapidly decomposed such that battery charging does not ensue effectively.

Accordingly, a technique has been devised to suppress decomposition due to reduction of the organic solvent, whereby various compounds are added to a non-aqueous solvent electrolyte for the purpose of controlling the negative electrode surface film (SEI: Solid Electrolyte Interface, hereinafter referred to as "SEI surface film", and also referred to as a passivated layer) so as not to cause the negative electrode active material to react directly with the organic solvent. For example, Japanese Patent Laid-Open No. H08(1996)-045545 (Claims and columns Nos. [0009] to [0012] and [0023] to [0036]) described below discloses a technique of adding at least one member selected from vinylene carbonate and derivatives thereof to an electrolytic solution of a non-aqueous solvent secondary battery, forming an SEI surface film on the negative electrode active substrate layer thereof with additives before lithium intercalates to the negative electrode at initial charging such that the film acts as a barrier to the intercalation of solvent molecules at the periphery of lithium ions.

Further, for the same purpose, Japanese Patent Laid-Open No. 2001-006729 (Claims and columns Nos. [0006] to [0014]) discloses a technique of adding a vinylethylene carbonate compound as an additive in the non-aqueous solvent electrolyte, while Japanese Patent Laid-Open No. 2001-202991 (Claims and columns Nos. [0006] to [0009]) discloses a technique of adding ketones, and Japanese Patent Laid-Open No. 2003-151623 (Claims and columns Nos. [0008] to [0009], and [0022] to [0031]) discloses a technique of adding at least one of vinylene carbonate, cyclic sulfonic acid or cyclic sulfate ester and cyclic acid anhydride while including vinyl ethylene carbonate. Further, Japanese Patent Laid-Open No. 2000-268859 (Claims and columns Nos. [0007] to [0008]) discloses a technique of adding cyclic acid anhydride, while Japanese Patent Laid-Open No. 2002-352852 (Claims and columns Nos. [0010] to [0013]) discloses a technique of adding a cyclic acid anhydride and a vinyl ethylene carbonate compound, respectively.

Among them, while succinic acid anhydride or a succinic acid anhydride derivative serving as a sort of cyclic acid anhydrides is excellent in suppressing decomposition due to the reduction of PC or BC, the resistance of the SEI film increases, causing the deterioration of the battery's charge/discharge characteristics. Further, where succinic acid anhydride is used, the diglycolic acid anhydride as a sort of cyclic acid anhydrides is preferentially reduced to PC or BC at the negative electrode to form the SEI film, such that the effect of suppressing the decomposition of PC or BC is rather insignificant. In other words, the decomposition of PC or BC cannot be suppressed completely. Further, where succinic acid anhydride or succinic acid anhydride derivative, or diglycolic acid anhydride is added in great amounts, the ionic conductivity of the electrolytic solution is reduced, causing the resistance of the SEI film to increase, leading to the deterioration of the battery's charge/discharge characteristics, as well as the remarkable evolution of gases while charging during storage, thereby causing the battery to swell greatly.

In addition, since the cyclic acid anhydride has poor oxidation resistance at high temperature when charge/discharge cycles are conducted at high temperature, oxidative decomposition proceeds vigorously to evolve great amounts of gases, thereby reducing the effective area of the electrode plate causing its capacity to deteriorate. Further, since the concentration of the cyclic acid anhydride in the cell diminishes due to the oxidative decomposition of the cyclic acid anhydride, the decomposition due to the reduction of the solvent at the negative electrode is not effectively suppressed, accelerating deterioration of its capacity. Particularly, in the battery using carbonaceous material with increased degree of graphitization and high capacity for the negative electrode, deterioration at high temperature occurs remarkably in the case of an electrolyte containing PC or BC.

As a result of various studies made on the mechanism for forming the SEI surface film described above, the present inventors have found that when a cyclic acid anhydride and an aromatic compound having at least one electron donating group are added together in a non-aqueous solvent electrolyte, decomposition due to reduction of the non-aqueous solvent can be prevented effectively, and the impedance of the SEI surface film can be decreased while the charge/discharge characteristics of the battery at high temperature can be further improved without lowering its initial discharge capacity and the amount of gas evolved can be lowered drastically.

While the reason for generating such a result is not yet apparent at present and requires further study, it is believed that the object of the invention can be achieved on the assumption that the aromatic compound containing the electron donating group is oxidized preferentially in relation to the oxidative decomposition of the cyclic acid anhydride during charging, thereby suppressing the evolution of gases caused by oxidative decomposition of the cyclic acid anhydride, and further controlling the reduction of the concentration of the cyclic acid anhydride in the cell, and since negative charges are applied to the aromatic ring because it contains the electron donating group, positive charges generated by oxidation are easily stabilized.

Accordingly, the present invention intends to provide a non-aqueous solvent secondary battery capable of lowering the impedance of the SEI surface film, improving the charge/discharge characteristics of the battery at high temperature without lowering its initial discharge capacity and drastically reducing the amount of gases evolved.

SUMMARY OF THE INVENTION

The foregoing objective can be attained by a non-aqueous solvent secondary battery in accordance with the invention, having a positive electrode containing a positive electrode active material capable of reversibly occluding and releasing lithium, a negative electrode containing a negative electrode active material capable of reversibly occluding and releasing lithium and a non-aqueous solvent electrolyte containing (1) cyclic acid anhydride, and (2) an aromatic compound having at least one electron donating group.

The non-aqueous solvent (organic solvent) constituting the non-aqueous solvent electrolyte can include, for example, carbonates, lactones, ethers and esters. Two or more solvents can be mixed for use, preferably as carbonates, lactones, ethers, ketones and esters, although carbonates are more appropriate for use.

Specific examples can include ethylene carbonate (EC), propylene carbonate (PC), butylene carbonate (BC), dimethyl carbonate (DMC), methyl ethyl carbonate (MEC), diethyl carbonate (DEC), γ-butyrolactone, γ-valerolactone, γ-dimethoxyethane, tetrahydrofuran, 1,4-dioxane, and diethyl carbonate. Ethylene carbonate and linear carbonate are suitable from the view point of improving charge/discharge efficiency.

The electrolyte constituting the non-aqueous solvent electrolyte can include lithium salts such as lithium perchlorate ($LiClO_4$), lithium hexafluoro phosphate ($LiPF_6$), lithium boro fluorate ($LiBF_4$), lithium hexafluoro arsenate ($LiAsF_6$), lithium trifluoro methyl sulfonate ($LiCF_3SO_3$), and lithium bistrifluoromethyl sufonyl imide ($LiN(CF_3SO_2)_2$). Of these, $LiPF_6$ or $LiBF_4$ is preferably used and the amount dissolved in the non-aqueous solvent should preferably range from 0.5 to 2.0 mol/l.

As the positive electrode active material, lithium-transition metal composite oxide represented by $Li_xMO_2$, in which M is at least one of Co, Ni, and Mn). That is, any of $LiCoO_2$, $LiNiO_2$, $LiNi_yCo_{1-y}O_2$ (y=0.01 to 0.99), $Li_{0.5}MnO_2$, $LiMnO_2$, or $LiCo_xMn_yNi_zO_2$ (x+y+z=1) alone, or a mixture of such lithium-transition metal composite oxides, can be used.

As the negative electrode active material, at least one member selected from the group consisting of carbonaceous material, siliceous material and metal oxide capable of occluding and releasing lithium is used. Carbonaceous materials of higher graphitization degree are particularly preferred since they have high capacity and are more effective in attaining the object of the invention.

Further, in the non-aqueous solvent secondary battery according to the invention, the cyclic acid anhydride is represented by the following formula:

[Chemical formula 2]

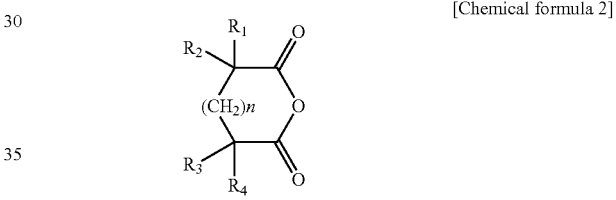

(where n is an integer of 0 to 4, and $R_1$ to $R_4$ may be identical or different from each other, each of $R_1$ to $R_4$ representing H or an organic group, or $R_1$ to $R_4$ may form a ring).

Further, in the non-aqueous solvent secondary battery described above, the cyclic acid anhydride comprises at least one member selected from any of maleic acid anhydride, phthalic acid anhydride, succinic acid anhydride, methyl succinic acid anhydride, 2,2-dimethyl succinic acid anhydride, glutaric acid anhydride, 1,2-cyclohexane dicarboxylic acid anhydride, cis-1,2,3,6-tetrahydrophthalic acid anhydride, cis-5-norbornene-endo-2,3-dicarboxylic acid anhydride, phenyl succinic acid anhydride, 2-phenyl glutaric acid anhydride, or nonenyl succinic acid anhydride.

In the non-aqueous solvent secondary battery described above, the content of cyclic acid anhydride ranges from 0.01 mass % to 10 mass % based on the mass of the non-aqueous solvent electrolyte. The content of cyclic acid anhydride preferably ranges from 0.05 mass % to 5 mass % based on the mass of the electrolytic solution.

It has been found that the effect of adding less than 0.01 mass % of cyclic acid anhydride is not substantially significant. On the other hand, if the amount added exceeds 10 mass %, the amount of the electrolyte dissolved is much less as to reduce its concentration and thereby decrease the electroconductivity of the non-aqueous solvent electrolyte. Accordingly, the content of cyclic acid anhydride should preferably range from 0.05 to 5 mass % based on the entire mass of the electrolyte.

Further, in the non-aqueous solvent secondary battery according to the invention described above, the electron donating group comprises at least one member selected from any of the alkyl group, alkoxy group, alkylamino group and amine in which each of the alkyl group, the alkoxy group, or the alkylamino group includes a halogen substituted group and a cycloaliphatic group.

Further, in the non-aqueous solvent secondary battery according to the invention described above, the alkyl group contains 1 or more and 8 or less of carbon atoms, the alkoxy group contains 1 or more and 5 or less of carbon atoms, and the alkylamino group contains 1 or more and 6 or less of carbon atoms.

Further, in the non-aqueous solvent secondary battery according to the invention described above, the electron donating group of the aromatic compound comprises at least one member selected from toluene, ethylbenzene, propylbenzene, cumene, 1,3,5-trimethylbenzene, butylbenzene, sec-butylbenzene, tert-butylbenzene, 3-isopropyl toluene, isobutylbenzene, amylbenzene, sec-amylbenzene, tert-amylbenzene, 4-tert-butyltoluene, (2,2-dimethylpropyl) benzene, 4-fluoro-tert-butylbenzene, 2,4-difluoro-tert-butylbenzene, anisole, ethoxybenzene, propoxybenzene, 4-methylanisole, 3-fluoroanisole, 4-fluoroanisole, 2,4-difluoroanisole, 3,5-difluoroanisole, aniline, N-methylaniline, N-ethylaniline, N,N-dimethylaniline, cyclopropylbenzene, cyclobutylbenzene, cyclopenthybenzene, cyclohexylbenzene, indane (also referred to as hydroindene or the like), benzocyclobutene, or 1,2,3,4-tetrahydrophthalene.

In the non-aqueous solvent secondary battery described above, the content of the aromatic compound containing the electron donating group ranges from 0.01 to 10 mass % based on the entire mass of the electrolyte. The content of the aromatic compound containing the electron donating group preferably ranges from 0.05 to 5 mass % based on the entire mass of the electrolyte. Where the content of the aromatic compound containing the electron donating group is less than 0.01% based on the entire mass of the electrolyte, no positive effect is obtained, but in case it exceeds 10 mass %, saturation occurs such that the amount of electrolytic solvent diminishes to the extent that ionic conductivity is reduced. Therefore, the content of aromatic compound containing the electron donating group should preferably range from 0.05 to 5 mass % based on the entire mass of the electrolyte.

In the non-aqueous solvent secondary battery described above, the mass ratio between the aromatic compound containing the electron donating group and the cyclic acid anhydride in the non-aqueous solvent electrolyte ranges from 1:2 to 2:1. Where the mass ratio between the aromatic compound containing the electron donating group and the cyclic acid anhydride is smaller than the aforementioned range, the resistance of the SEI film increases resulting in greater deterioration of the battery's charge/discharge characteristics. On the other hand, in the case where the mass ratio between the aromatic compound containing the electron donating group and the cyclic acid anhydride exceeds the aforementioned range, the suppression of the decomposition of the non-aqueous solvent is reduced, leading to a remarkable evolution of gases during charge/discharge cycles at high temperature and excessive swelling of the cell.

Further, in the non-aqueous solvent secondary battery described above, the negative electrode active material is a carbonaceous material having a d value of 0.340 nm or less for the lattice plane (002 plane) in X-ray diffraction and the non-aqueous solvent contains propylene carbonate (PC) or butylene carbonate (BC). As the carbonaceous substance crystallizes, the d value for the lattice plane (002 plane) in X-ray diffraction decreases while the d value is 0.340 nm or less for the natural graphite, artificial graphite with higher degree of crystallization. The invention is likewise applicable in the case where the negative electrode contains such carbonaceous substance which crystallizes thoroughly such that a non-aqueous solvent secondary battery of high capacity can be obtained.

Further, in the non-aqueous solvent secondary battery described above, the non-aqueous solvent electrolyte is gelled. In such case, since the gas evolved upon oxidative decomposition of the cyclic acid anhydride tends to stagnate between the positive and negative electrode plates and capacity is remarkably lowered due to the reduction of the effective area of the electrode plates, the usefulness of the invention can be easily appreciated.

In the case where the non-aqueous solvent electrolyte is gelled, resistance of the SEI film formed on the negative electrode boundary usually increases since the polymer ingredient is deposited on the surface of the negative electrode active material, as to greatly lower the charge/discharge characteristics of the battery compared to that of the non-aqueous solvent secondary battery using the liquid electrolyte. However, since the increase in resistance caused by gelation is offset by the decrease in resistance of the SEI film owing to the addition of the cyclic acid anhydride and the aromatic compound containing the electron donating group in the non-aqueous solvent electrolyte, a gelled non-aqueous solvent secondary battery having good characteristics can be obtained.

In the gelled electrolyte, the polymeric material kept in the electrolytic solution can be in the form of alkylene oxide series polymers or fluoro series polymers such as polyvinylidene fluoride—hexafluoro propylene copolymer. A gelled electrolyte can be produced by immersing such kind of polymeric material such as an isocyanate crosslinked product of polyethylene oxide, polypropylene oxide or polyalkylene oxide in the electrolytic solution.

Further, a polymerizing treatment can be applied to an electrolytic solution containing a polymerizable gelling agent such as UV-ray hardening or heat hardening, or a polymer dissolved at high temperature in an electrolytic solution cooled at normal temperature to form a gelled electrolyte can also be used. In such kind of electrolytic solution, the polymerizable gelling agent can include, for example, those having an unsaturated double bond such as any of the acryloyl group, methacryloyl group, vinyl group and aryl group, as well as those having cationically polymerizable cyclic ethers such as epoxy, oxetane and formal.

Specifically, it can include those monomers having an unsaturated double bond such as acrylic acid, methyl acrylate, ethyl acrylate, ethoxyethyl acrylate, methoxyethyl acrylate, ethoxyethoxyethyl acrylate, polyethylene glycol monoacrylate, ethoxyethyl methacrylate, ethoxyethyl methacrylate, polyethylene glycol monomethacrylate, N,N-diethylaminoethyl acrylate, glycidyl acrylate, aryl acrylate, acrylonitrile, diethylene glycol diacrylate, tetraethylene glycol diacrylate, polyethylene glycol diacrylate, polyethylene glycol dimethacrylate, polypropylene glycol diacrylate, polypropylene glycol dimethacrylate, polyalkylene glycol diacrylate, polyalkylene glycol dimethacrylate, trimethylol propane alkoxylate triacrylate, pentaerithrytol alkoxylate triacrylate, and pentaerithrytol alkoxylate tetraacrylate, copolymer of methyl methacrylate and (3-ethyl-3-oxetanyl) methyl acrylate (about 400,000 molecular weight), or cyclic ether group-containing compound such as tetraethylene glycol bisoxetane.

While the monomer having an unsaturated bond can be polymerized by heat, UV-rays, electron beams, etc., a polymerization initiator may be introduced in the electrolytic solution in order to effectively induce the reaction. In this regard, an organic peroxide such as benzoyl peroxide, t-butyl peroxycument, lauroyl peroxide, di-2-ethylhexyl peroxy dicarbonate, t-butyl peroxy pivalate, and t-hexyl peroxy isopropyl monocarbonate can be used as polymerization initiator. Further, the cyclic ether group-containing compound initiates polymerization with $Li^+$ or a slight amount of $H^+$ in the electrolytic solution, or the application of heat or during electric charging/discharging.

The polymer dissolved at high temperature in an electrolytic solution cooled at normal temperature to form a gelled electrolyte may comprise any material which gels with the electrolytic solution and is stable as cell material. The material can include, for example, a polymer having a ring such as polyvinyl pyridine or poly-N-vinyl pyrrolidone; acrylic derivative polymer such as methyl polyacrylate or ethyl polyacrylate; fluoro resin such as polyvinyl fluoride or polyvinylidene fluoride; CN group-containing polymer such as polyacryronitrile or polyvinylidene cyanide; polyvinyl alcohol polymer such as polyvinyl acetate or polyvinyl alcohol; or a halogen containing polymer such as polyvinyl chloride or polyvinylidene chloride. Further, mixtures, modified products, derivatives, random copolymers, graft copolymers or block copolymers combined with any of the polymers described above may also be used. The mass average molecular weight of the polymer should range from 10,000 to 5,000,000. If the molecular weight is lower than the abovementioned range, the gel is not sufficiently formed. On the contrary, if the molecular weight is higher than the above-mentioned range, viscosity increases excessively as to make the polymer difficult to handle.

Further, in the non-aqueous solvent secondary battery described above, the content of the electrolytic solution in the gelled non-aqueous solvent electrolyte is 50 mass % or more and 99.5 mass % or less based on the total amount of the gelled non-aqueous solvent electrolyte. Further, the content of the electrolytic solution in the gelled non-aqueous solvent electrolyte is preferably 75 mass % or more and 99.5 mass % or less, based on the total amount of the gelled non-aqueous solvent electrolyte.

In the case where the content of the electrolytic solution in the gelled non-aqueous solvent electrolyte is less than 50 mass %, the ionic conductivity is diminished to the extent of lowering the discharge capacity of the battery at high load. Preferably therefore, it should be 75 mass % or more based on the total amount of the gelled electrolytic solution. Further, in the case where the content of the electrolytic solution exceeds 99.5 mass %, storing the electrolytic solution becomes difficult and tends to cause liquid leakage, while the gelled non-aqueous solvent electrolyte does not acquire any mechanical strength.

Further, the non-aqueous solvent secondary battery described above has a laminated exterior body. In such kind of non-aqueous solvent secondary battery, the mass and thickness of the exterior body can be reduced, so that a non-aqueous solvent secondary battery small in size and light in weight can be obtained. Further, because the exterior body of the battery is laminated, swelling of the battery becomes less conspicuous, thereby enhancing the practicality of the invention.

In the non-aqueous solvent secondary battery according to the invention, since the non-aqueous solvent electrolyte contain (1) cyclic acid anhydride and (2) the aromatic compound comprising at least one electron donating group, it is possible to provide a non-aqueous solvent secondary battery with extremely low impedance for the SEI film and, as will be specifically described later, with improved charge/discharge characteristics at high temperature without affecting its the initial discharge capacity and at the same time drastically lowering the amount of gas evolved.

BRIEF DESCRIPTION OF THE DRAWINGS

Preferred embodiments of the present invention will be described in detail based on the drawings, wherein FIG. 1 refers to a graph showing the change of residual capacity of non-aqueous solvent secondary batteries of up to 300 cycles as discussed in Examples 3, 14 and 18, and Comparative Examples 2, and 5 to 7.

DESCRIPTION OF THE PREFERRED EMBODIMENTS

Figure 1:
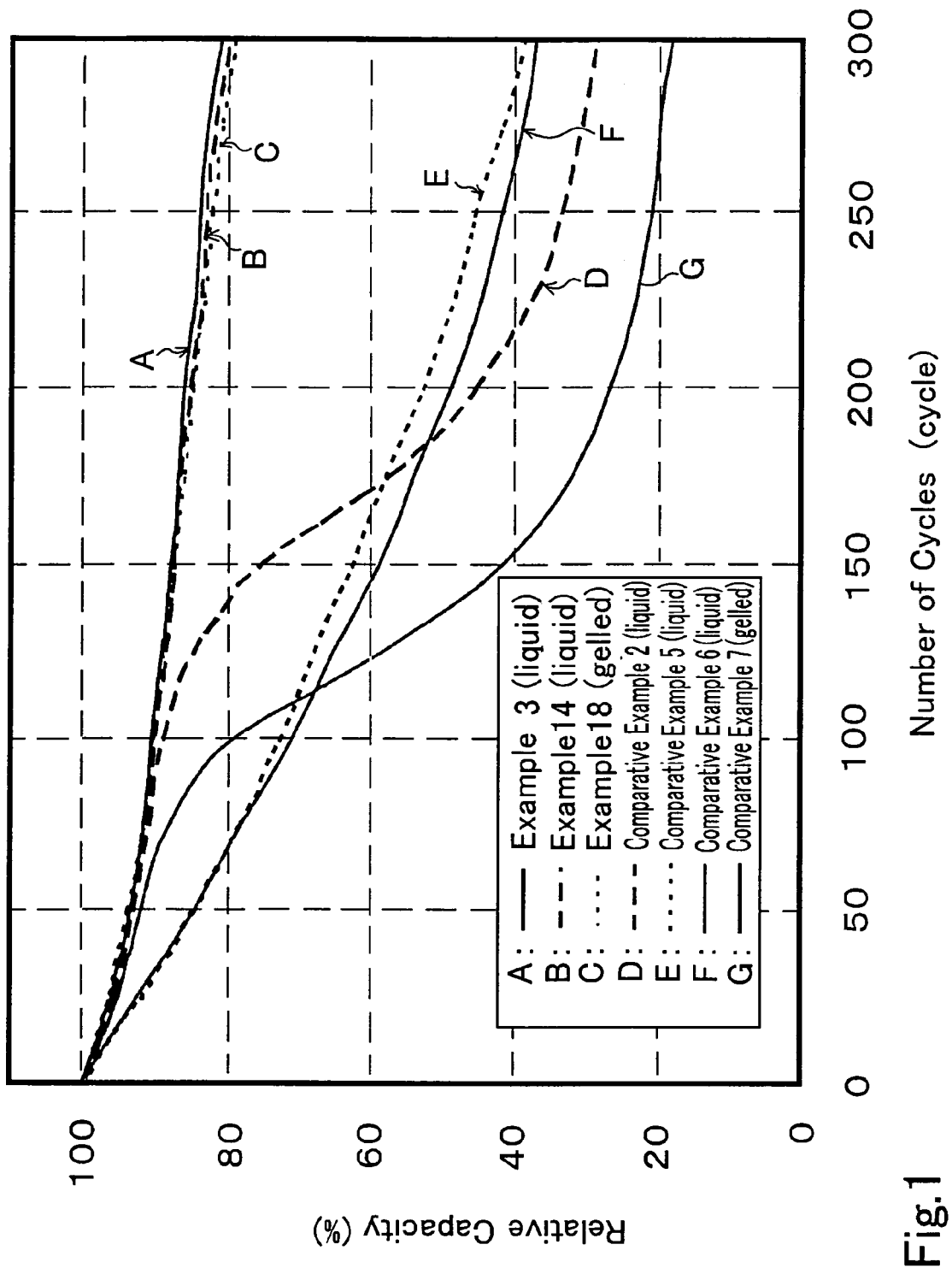

The present invention is hereafter specifically described in the form of preferred embodiments illustrated by way of examples and comparative examples. First, the method of manufacturing a non-aqueous solvent secondary battery in common with the example and the comparative example will be described.

<Preparation of the Positive Electrode Plate>

A positive electrode active material comprising $LiCoO_2$, a carbonaceous conductive agent such as acetylene black or graphite (for example, 5 mass %) and a binder comprising polyvinylidene fluoride (PVdF) (for example, 3 mass %) dissolved in an organic solvent comprising N-methyl pyrrolidone, are mixed to form an active material slurry or an active material paste. Both surfaces of a positive electrode current collector (for example, an aluminum foil or aluminum mesh of 15 µm thickness) are then uniformly coated with the active material slurry or the active material paste with the aid of a die coater or a doctor blade in the case of the active material slurry or by means of the roller coating method in the case of the active material paste to form a positive electrode plate coated with the active material layer. Then, the positive electrode plate coated with the active material layer is made to go through a drier to remove the organic solvent which was necessarily used in preparing the slurry or paste. Thereafter, the dried positive electrode plate is rolled by means of a rolling press to form a positive electrode plate 0.15 mm thick.

<Preparation of Negative Electrode Plate>

A negative electrode active material comprising natural graphite (d(0002) value =0.335 nm) and a binder comprising polyvinylidene fluoride (PVdF) (for example, 3 mass %) dissolved in an organic solvent comprising N-methyl pyrrolidone are mixed to form a slurry or a paste. Both surfaces of a negative electrode current collector (for example, copper foil of 10 µM thickness), are then uniformly coated with the active material slurry or the active material paste with the aid of a die coater or a doctor blade in the case of the active material slurry or by means of the roller coating method in the case of the active material paste to form a negative electrode plate coated with the active material layer. Then, the negative electrode plate coated with the active material layer is made to go through a drier to remove the organic solvent which was necessarily used in preparing the slurry or paste. Thereafter, the dried negative electrode plate is rolled by means of a rolling press to form a negative electrode plate 0.14 mm thick.

<Preparation of the Electrode Body>

The positive electrode plate and the negative electrode plate prepared in the manner described above are stacked with a finely porous film (for example, 0.020 mm thickness) comprising a polyolefin resin having low reactivity and an inexpensive organic solvent interposed between them, with the center lines aligned in the lateral direction of the respective electrode plates, and thereafter helically wound by a winding machine, and the outermost periphery of the wound plates is secured with a tape to form a spiral electrode body. Several electrode bodies prepared in the manner described above are respectively inserted in exterior structures constituted by using aluminum laminates. Then, a positive electrode collection tab and a negative electrode collection tab respectively made to extend from each such electrode body are welded together with the corresponding exterior structure.

<Preparation of the Electrolyte>

An electrolytic solution is prepared by dissolving $LiPF_6$ to form 1.0M in a mixed solvent of: EC/PC/DEC with a mass ratio of 40/10/50. The specific kind and amount of compounds to be added are shown in Table 1, with uniform mass ratio relative to the mass of the electrolytic solution.

In the preparation of the gelled electrolyte, a pre-gel is prepared by adding 8 mass % of tetraethylene glycol dimethacrylate as monomer and adding 0.3 mass % of t-butyl peroxy pivalate as polymerization initiator to the electrolytic solution. The specific kind and amount of the compounds to be added are shown in Table 1, with uniform mass ratio relative to the mass of the electrolyte (electrolytic solution+monomer+polymerization initiator).

<Preparation of the Battery>

Then, each of the various kinds of non-aqueous solvent electrolytes was charged by a required amount through the opening of each exterior body followed by sealing to prepare lithium ion non-aqueous solvent secondary batteries with a designed capacity of 750 mAh (for all of the examples and comparative examples). With respect to the making of the gelled electrolyte battery, lithium polymer non-aqueous solvent secondary batteries were prepared by charging pre-gel by a required amount, followed by sealing the opening of each such battery and heating each battery at 70° C. for 3 hours to induce polymerization.

EXAMPLES 1 to 20, COMPARATIVE EXAMPLES 1 to 7

Initially, by using the liquid non-aqueous solvent electrolyte, eight (8) types of non-aqueous solvent secondary batteries were prepared by using tert-amylbenzene as the aromatic compound containing the electron donating group while adopting different kinds of cyclic acid anhydride, to serve as the non-aqueous solvent secondary batteries referred to as Examples 1 to 8.

In the same manner, nine (9) types of non-aqueous solvent secondary batteries were prepared by using succinic acid anhydride as the cyclic acid anhydride while modifying the kind of aromatic compound containing the electron donating group, to serve as the non-aqueous solvent secondary batteries referred to as Examples 9 to 17.

Further, by using the gelled non-aqueous solvent electrolytes, three (3) types of non-aqueous solvent secondary batteries were prepared by using succinic acid anhydride as the cyclic acid anhydride while changing the kind of aromatic compound containing the electron donating group, to serve as the non-aqueous solvent secondary batteries referred to as Examples 18 to 20.

In the same manner, by using the liquid non-aqueous solvent electrolyte, four (4) types of non-aqueous solvent secondary batteries were prepared without adding the aromatic compound containing the electron donating group while modifying the kind of the cyclic acid anhydride, to serve as Comparative Examples 1 to 4.

Thereafter, a non-aqueous solvent secondary battery was prepared without adding cyclic acid anhydride while using tert-amylbenzene as the aromatic compound containing the electron donating group, to serve as Comparative Example 5.

Further, a non-aqueous solvent secondary battery was prepared without adding the aromatic compound containing the electron donating group or the cyclic acid anhydride, to serve as Comparative Example 6.

Finally, a non-aqueous solvent secondary battery was prepared without adding the aromatic compound containing the electron donating group but adding succinic acid anhydride as the cyclic acid anhydride, to serve as Comparative Example 7.

In all of the Examples 1 to 20 and Comparative Examples 1 to 7, the amount of cyclic acid anhydride added (except for Comparative Examples 5 and 6 in which no cyclic acid anhydride was involved), was 1.5 mass % based on the entire mass of the non-aqueous solvent electrolyte, while the amount of aromatic compound containing the electron donating group added (except for Comparative Examples 6 and 7 in which no aromatic compound was involved), was 1.0 mass % based on the entire mass of the non-aqueous solvent electrolyte.

<Charge/Discharge Conditions>

For each of the non-aqueous solvent secondary batteries referred to as Examples 1 to 20 and Comparative Examples 1 to 7, various types of charge/discharge tests were conducted under the charge/discharge conditions explained below.

<Test for Measuring Initial Discharge Capacity>

At first, each battery was charged at a constant current of 1 It (1C)=750 mA at 25° C., and upon reaching a cell voltage of 4.2 V, charged at a constant voltage of 4.2 V for 3 hours. Then, each battery was discharged at a constant current of 1It until its cell voltage dropped to 2.75 V, at which point its discharge capacity was determined as the initial discharge capacity. The results are shown in Table 1.

<Test for Measuring Charge/Discharge Cyclic Characteristics at 60° C.>

After measuring their initial discharge capacity, the charge/discharge cycle test for 300 cycles at 60° C. was conducted with respect to each battery, under the following conditions.

(Charge Cycle)

Charging at a constant current of 1 It=750 mA and upon reaching a cell voltage of 4.2 V, charging at a constant voltage of 4.2 V for 3 hours.

(Discharge Cycle)

Discharging at a constant current of 1 It=750 mA until the cell voltage dropped to 2.7 V.

After 300 cycles at 60° C., the residual capacity of each battery was measured according to the following formula, and gases evolved during the test were collected and the volume thereof measured.

Residual capacity (%)=(discharge capacity at 300 cycle/initial discharge capacity)

Table 1 collectively shows the results obtained. FIG. 1 illustrates the change of residual capacity up to 300 cycles pertaining to Examples 3, 14 and 18 and Comparative Examples 2, 5, 6 and 7.

TABLE 1

| | Kind of Cyclic Acid Anhydride | Kind of Aromatic Compound containing the electron donating group | Electrolyte | Initial Discharge Capacity (mAh) | Residual Capacity at 60° C. cycle (%) | Amount of Gas Evolved after cycle (ml) |
|---|---|---|---|---|---|---|
| Example 1 | Maleic acid anhydride | Tert-amylbenzene | Liquid | 732 | 72 | 0.1> |
| Example 2 | Phthalic acid anhydride | | | 728 | 67 | 0.1> |
| Example 3 | Succinic acid anhydride | | | 752 | 81 | 0.1> |
| Example 4 | Methyl succinic acid anhydride | | | 748 | 80 | 0.1> |
| Example 5 | Glutaric acid anhydride | | | 750 | 82 | 0.1> |
| Example 6 | Phenyl succinic acid anhydride | | | 751 | 77 | 0.1> |
| Example 7 | Glycolic acid anhydride | | | 747 | 75 | 0.4 |
| Example 8 | 2-phenyl glutaric acid anhydride | | | 741 | 76 | 0.1> |
| Example 9 | Succinic acid anhydride | Cumene | Liquid | 750 | 74 | 0.1> |
| Example 10 | | Tert-butylbenzene | | 751 | 81 | 0.1> |
| Example 3 | | Tert-amylbenzene | | 752 | 81 | 0.1> |
| Example 11 | | 2,4-difluoro-tert-butylbenzene | | 750 | 77 | 0.1> |
| Example 12 | | Anisole | | 752 | 74 | 0.3 |
| Example 13 | | 2,4-difluoroanisole | | 752 | 66 | 0.6 |
| Example 14 | | 3,5-difluoroanisole | | 749 | 80 | 0.1> |
| Example 15 | | Cyclopropyl benzene | | 748 | 67 | 0.1> |
| Example 16 | | Cyclohexyl benzene | | 746 | 78 | 0.1> |
| Example 17 | | Indane | | 742 | 71 | 0.6 |
| Example 18 | Succinic acid anhydride | tert-amylbenzene | Gelled | 751 | 79 | 0.1> |
| Example 19 | | 3,5-difluoroanisole | | 750 | 78 | 0.1> |
| Example 20 | | Cyclohexyl benzene | | 748 | 78 | 0.1> |
| C. Example 1 | Maleic acid anhydride | None | Liquid | 733 | 24 | 5.5 |
| C. Example 2 | Succinic acid anhydride | | | 749 | 29 | 5.3 |
| C. Example 3 | Glutaric acid anhydride | | | 752 | 32 | 4.5 |
| C. Example 4 | Glycolic acid anhydride | | | 749 | 21 | 7.4 |
| C. Example 5 | NONE | Tert-amylbenzene | Liquid | 711 | 39 | 1.8 |
| C. Example 6 | | NONE | | 714 | 37 | 2.3 |
| C. Example 7 | Succinic acid anhydride | NONE | Gelled | 751 | 18 | 6.8 |

Addition amount of cyclic acid anhydride: 1.5 mass %
Addition amount of aromatic compound containing electron: Donating group: 1.0 mass %
Electrolytic solution: EC/PC/DEC = 40/10/50 (mass %)
Gelled electrolyte: Tetraethylene glycol dimethacrylate 8 mass %

Based on the results shown in Table 1, the following conclusions can be made in the case of the liquid non-aqueous solvent electrolyte, with reference to the non-aqueous solvent secondary battery of Comparative Example 6 without the standard addition of both the cyclic acid anhydride and the aromatic compound containing the electron donating group.

(a) The initial discharge capacity and the residual capacity after 300 cycles at 60° C. of the non-aqueous solvent secondary battery of Comparative Example 5 in which only the aromatic compound containing the electron donating group was added (without the cyclic acid anhydride) are substantially identical to those of Comparative Example 6 with a slightly lower amount of gas evolved after 300 cycles at 60° C.

(b) The increase in initial discharge capacity of each of the non-aqueous solvent secondary batteries of Comparative Examples 1 to 4 in which only the cyclic acid anhydride was added (without the aromatic compound containing the electron donating group) is greater compared to that of Comparative Example 6 but the residual capacity of each such battery after 300 cycles at 60° C. deteriorates greatly and the amount of gas evolved after 300 cycles at 60° C. is much larger.

(c) The increase in initial discharge capacity of each of the non-aqueous solvent secondary batteries of Examples 1 to 17 in which both the cyclic acid anhydride and the aromatic compound containing the electron donating group were added, is larger than that of Comparative Example 6 but similar to those of Comparative Examples 1 to 4. However, the residual capacity of such batteries greatly improves compared to those of Comparative Example 6 and Comparative Examples 1 to 4 after 300 cycles at 60° C. while the amount of gas evolved after 300 cycles at 60° C. is much less than those of the latter.

Further, as graphically illustrated in FIG. 1, the change in residual capacity up to 300 cycles at 60° C. is such that, while residual capacity gradually diminishes as manifested by the non-aqueous solvent secondary batteries of Examples 3 and 14 up to 300 cycles, the decrease in residual capacity with respect to the non-aqueous solvent secondary batteries of Comparative Examples 5 and 6 is significantly larger than that manifested by Examples 3 and 14 as described above. Further, it can be seen that the non-aqueous solvent secondary battery of Comparative Example 2 in which only cyclic acid anhydride was added shows a decrease in residual capacity substantially identical to that manifested by Examples 3 and 14 up to about 100 cycles while degradation proceeds rapidly thereafter.

On the other hand, where the gelled non-aqueous solvent electrolyte was used, the following conclusions were derived.

(d) While the increase in initial discharge capacity of the non-aqueous solvent secondary battery of Comparative Example 7 in which only the cyclic acid anhydride (without the aromatic compound containing the electron donating group) was added, is greater compared to that of Comparative Example 6, the residual capacity of the battery after 300 cycles at 60° C. deteriorates greatly, and at the same time, the amount of gas evolved after 300 cycles at 60° C. is much larger.

(e) While the increase in initial discharge capacity of each of the non-aqueous solvent secondary batteries of Examples 18 to 20 in which both the cyclic acid anhydride and the aromatic compound containing the electron donating group were added is larger than that of Comparative Example 6 and similar to that of Comparative Example 7, the residual capacity of each such battery after 300 cycles at 60° C. is much higher while the amount of gas evolved after 300 cycles at 60° C. is much lower compared to those of Comparative Examples 6 and 7.

(f) Further, as graphically illustrated in FIG. 1, the change in residual capacity up to 300 cycles at 60° C. is such that, while residual capacity gradually diminishes as manifested by the non-aqueous solvent secondary battery of Example 18 up to 300 cycles, the decrease in residual capacity is substantially identical to that manifested by Examples 3 and 14. Further, it can be seen that the non-aqueous solvent secondary battery of Comparative Example 7 in which only cyclic acid anhydride was added shows a significant decrease in residual capacity substantially identical to that manifested by Example 18 up to about 70 cycles while degradation proceeds rapidly thereafter.

Based on the results described in paragraphs (a) to (f) above, in each of the cases involving the liquid non-aqueous solvent electrolyte and the gelled non-aqueous solvent electrolyte, the following conclusions can be made.

(a') While only the addition of the cyclic acid anhydride brings about the improvement of initial discharge capacity, the residual capacity of the battery after 300 cycles at 60° C. significantly deteriorates and the amount of gas evolved after 300 cycles at 60° C. greatly increases.

(b') When both the cyclic acid anhydride and the aromatic compound containing the electron donating group are added, satisfactory results can be obtained for the initial discharge capacity, the residual capacity after 300 cycles at 60° C. and the amount of gas evolved after 300 cycles at 60° C.

EXAMPLE 21 to EXAMPLE 27

In Examples 21 to 25, non-aqueous solvent secondary batteries were prepared in the manner similar to the method of preparing the non-aqueous electrolytic solution secondary battery of Example 3, by adding succinic acid anhydride as the cyclic acid anhydride by 1.5 mass % relative to the entire mass of the non-aqueous solvent electrolyte, while modifying the amount of tert-amylbenzene as the aromatic compound containing the electron donating group from 0.1 to 3.0 mass % relative to the entire mass of the non-aqueous solvent electrolyte. The method of measuring the initial discharge capacity, the residual capacity after 300 cycles at 60° C. and the amount of gas evolved after 300 cycles at 60° C. of Examples 1 to 20 was adopted for measuring the same characteristics of the batteries of Examples 21 and 22. The results are collectively shown together with the results obtained for Example 3 in Table 2.

Further, non-aqueous solvent secondary batteries of Examples 26 and 27 were prepared in the manner similar to the method of preparing the non-aqueous electrolytic solution secondary battery of Example 14, by adding succinic acid anhydride as the cyclic acid anhydride by 1.5 mass % relative to the entire mass of the non-aqueous solvent electrolyte and adding 3,5-difluoroanisole as the aromatic compound containing the electron donating group by 0.5 and 2.0 mass % relative to the entire mass of the non-aqueous solvent electrolyte. Thereafter, the initial discharge capacity, the residual capacity after 300 cycles at 60° C. and the amount of gas evolved after 300 cycles at 60° C. of the batteries of Examples 26 and 27 were measured. The results are collectively shown together with the results obtained for Example 14 in Table 2.

TABLE 2

|  | Kind of Aromatic Compound containing the electron donating group | Amount Added (mass %) | Initial Discharge Capacity (mAh) | Residual Capacity at 6000 cycles (%) | Amount of Gas Evolved after cycle (ml) |
| --- | --- | --- | --- | --- | --- |
| Example 21 | tert-amylbenzene | 0.1 | 748 | 46 | 0.8 |
| Example 22 |  | 0.5 | 753 | 72 | 0.1> |
| Example 3 |  | 1.0 | 752 | 81 | 0.1> |
| Example 23 |  | 1.5 | 749 | 79 | 0.1> |
| Example 24 |  | 2.0 | 750 | 75 | 0.1> |
| Example 25 |  | 3.0 | 750 | 72 | 0.1> |
| Example 26 | 3,5-difluoroanisole | 0.5 | 746 | 74 | 0.1> |
| Example 14 |  | 1.0 | 749 | 80 | 0.1> |
| Example 27 |  | 2.0 | 748 | 76 | 0.1> |

Cyclic acid anhydride: succinic acid anhydride = 1.5 mass %
Electrolyte: liquid
Electrolytic solution: EC/PC/DEC = 40/10/50 (mass %) + 1M-LiPF6

As shown in Table 1, where the amount of aromatic compound containing the electron donating group added is as small as 0.1 mass %, the residual capacity of the non-aqueous solvent secondary battery of Example 21 after 300 cycles at 60° C. significantly deteriorates compared to those of Examples 22 to 27, and the amount of gas evolved after 300 cycles at 60° C. is higher compared to those of the latter and Examples 3 and 14. However, the results obtained for the battery of Example 21 are better compared to those of Comparative Examples 1 to 7. Where the amount of aromatic compound containing the electron donating group added is 0.5% or more, the results obtained with respect to the initial discharge capacity, the residual capacity after 300 cycles at 60° C. and the amount of gas evolved after 300 cycles at 60° C. of the non-aqueous solvent secondary batteries of Examples 22 to 27 were substantially identical to those obtained in the case of Example 3 or Example 14.

The improvement in residual capacity after 300 cycles at 60° C. and the significant decrease in the amount of gas evolved after 300 cycles at 60° C. becomes apparent with the addition of the aromatic compound containing the electron donating group to the non-aqueous solvent electrolyte in which the cyclic acid anhydride added is about 0.01 mass % or more relative to the entire mass of the non-aqueous solvent electrolyte, and such improvement even becomes more significant where the cyclic acid anhydride added is at 0.05 mass % or more and saturation at about 0.5 mass % or more tends to occur. Accordingly, the amount of the aromatic compound containing the electron donating group to be added is preferably 0.01 mass % or more and, more preferably, 0.05 mass % or more relative to the entire mass of the non-aqueous electrolyte. While the addition of up to about 10 mass % of aromatic compound containing the electron donating group provides the desired effect, since the ionic conductivity of the non-aqueous solvent electrolyte begins to diminish if more than 5 mass % thereof is added, the upper limit is preferably defined as 5 mass %.

What is claimed is:

1. A non-aqueous solvent secondary battery having a positive electrode containing a positive electrode active material capable of reversibly occluding and releasing lithium, a negative electrode containing a negative electrode active material capable of reversibly occluding and releasing lithium and a non-aqueous solvent electrolyte containing (1) cyclic acid anhydride, and (2) 3,5-difluoroanisole.

2. A non-aqueous solvent secondary battery according to claim 1, wherein the cyclic acid anhydride is represented by the following chemical formula:

[Chemical formula 1]

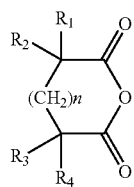

where n is an integer from 0 to 4, and $R_1$ to $R_4$ may be identical or different from each other, each of $R_1$ to $R_1$ representing H or an organic group, or $R_1$ to $R_4$ may form a ring.

3. A non-aqueous solvent secondary battery according to claim 2, wherein the cyclic acid anhydride comprises at least one member selected from any of maleic acid anhydride, phthalic acid anhydride, succinic acid anhydride, methyl succinic acid anhydride, 2,2-dimethyl succinic acid anhydride, glutaric acid anhydride, 1,2-cyclohexane dicarboxylic acid anhydride, cis 1,2,3,6-tetrahydrophthalic acid anhydride, cis-5-norbomene-endo-2,3-dicarboxylic acid anhydride, phenyl succinic acid anhydride, 2-phenyl glutaric acid anhydride, or nonenyl succinic acid anhydride.

4. A non-aqueous solvent secondary battery according to claim 1, wherein the content of the cyclic acid anhydride ranges from 0.01 mass % to 10 mass % based on the entire mass of the electrolyte.

5. A non-aqueous solvent secondary battery according to claim 4, wherein the content of the cyclic acid anhydride ranges from 0.05 to 5 mass % based on the entire mass of the electrolyte.

6. A non-aqueous solvent secondary battery according to claim 1, wherein the content of the 3,5-difluoroanisole ranges from 0.01 to 10 mass % based on the entire mass of the electrolyte.

7. A non-aqueous solvent secondary battery according to claim 6, wherein the content of the 3,5-difluoroanisole ranges from 0.05 to 5 mass % based on the entire mass of the electrolyte.

8. A non-aqueous solvent secondary battery according to claim 1, wherein the mass ratio between the 3,5-difluoroanisole and the cyclic acid anhydride in the non-aqueous solvent electrolyte ranges from 1:2 to 2:1.

9. A non-aqueous solvent secondary battery according to claim 1, wherein the negative electrode active material is a carbonaceous material having a d value of 0.340 nm or less for the lattice plane (002 plane) in X-ray diffraction and the non-aqueous solvent contains propylene carbonate or butylene carbonate.

10. A non-aqueous solvent secondary battery according to claim 1, wherein the non-aqueous solvent electrolyte is gelled.

11. A non-aqueous solvent secondary battery according to claim 10, wherein the content of the electrolytic solution in the gelled non aqueous solvent electrolyte is 50 mass % or more and 99.5 mass % or less based on the total amount of the gelled non-aqueous solvent electrolyte.

12. A non-aqueous solvent secondary battery according to claim 11, wherein the content of the electrolytic solution in the gelled non-aqueous solvent electrolyte is 75 mass % or more and 99.5 mass % or less based on the total amount of the gelled non-aqueous solvent electrolyte.

13. A non- aqueous solvent secondary battery according to claim 1, having a laminated exterior body.

* * * * *